US011665803B2

(12) United States Patent
Pilz (10) Patent No.: US 11,665,803 B2
(45) Date of Patent: May 30, 2023

(54) METHOD FOR ASSIGNING LIGHT SENSORS FOR REGULATING THE LIGHTING IN A LIGHTING SYSTEM

(71) Applicant: Osram GmbH, Munich (DE)

(72) Inventor: Axel Pilz, Neuenstein (DE)

(73) Assignee: OSRAM GmbH, Munich (DE)

( * ) Notice: Subject to any disclaimer, the term of this patent is extended or adjusted under 35 U.S.C. 154(b) by 24 days.

(21) Appl. No.: 17/279,110

(22) PCT Filed: Aug. 8, 2019

(86) PCT No.: PCT/EP2019/071306
§ 371 (c)(1),
(2) Date: Mar. 24, 2021

(87) PCT Pub. No.: WO2020/064191
PCT Pub. Date: Apr. 2, 2020

(65) Prior Publication Data
US 2021/0392732 A1 Dec. 16, 2021

(30) Foreign Application Priority Data

Sep. 26, 2018 (DE) ...................... 10 2018 216 474.6

(51) Int. Cl.
*H05B 47/11* (2020.01)
*H05B 45/12* (2020.01)
*H05B 41/39* (2006.01)

(52) U.S. Cl.
CPC ............. *H05B 47/11* (2020.01); *H05B 41/39* (2013.01); *H05B 45/12* (2020.01)

(58) Field of Classification Search
CPC ........ H05B 47/11; H05B 41/39; H05B 45/12; H05B 47/175; Y02B 20/40
See application file for complete search history.

(56) References Cited

U.S. PATENT DOCUMENTS 7,566,137 B2 * 7/2009 Veskovic ............... H05B 47/10
362/1
8,018,338 B2 * 9/2011 Huang ................... H05B 47/13
340/567
(Continued)

FOREIGN PATENT DOCUMENTS

DE     102010003804 A1    10/2011
EP         2747523 A1      6/2014
(Continued)

OTHER PUBLICATIONS

International Search Report issued for the PCT Patent Application No. PCT/EP2019/071306, dated Dec. 5, 2019, 4 pages (for informational purposes only).

(Continued)

*Primary Examiner* — Wei (Victor) Y Chan
(74) *Attorney, Agent, or Firm* — Viering, Jentschura & Partner mbB (57) ABSTRACT

A method for assigning light sensors for regulating a lighting system includes switching the lighting of the lighting system into a first switching state such that a first lighting group emits light with a predetermined luminous flux, switching the lighting of the lighting system into a second switching state such that the first lighting group emits light with a reduced luminous flux by comparison with the predetermined luminous flux or emits no light, and measuring a luminance of the light reflected by a reference surface respectively assigned to the light sensors with the aid of the light sensors to determine a first measurement value in the first switching state and a second measurement value in the second switching state. The method may further include assigning a sensor to the first lighting group based on a comparison of difference values formed for each of the light sensors, and storing the assignment.

18 Claims, 4 Drawing Sheets

(56) References Cited

U.S. PATENT DOCUMENTS

| | | | | |
|---|---|---|---|---|
| 9,743,496 | B2* | 8/2017 | Knauss | H05B 47/115 |
| 10,154,569 | B2* | 12/2018 | Harris | H05B 47/105 |
| 10,306,419 | B2* | 5/2019 | Abou-Rizk | G01S 5/0289 |
| 2007/0103007 | A1* | 5/2007 | Miki | H05B 47/19 |
| | | | | 307/149 |
| 2010/0244709 | A1* | 9/2010 | Steiner | G01J 1/0219 |
| | | | | 250/206 |
| 2011/0031897 | A1 | 2/2011 | Henig et al. | |
| 2012/0032601 | A1 | 1/2012 | Seeberger et al. | |
| 2013/0320862 | A1* | 12/2013 | Campbell | H05B 45/20 |
| | | | | 315/152 |
| 2014/0277805 | A1* | 9/2014 | Browne, Jr. | H04W 4/70 |
| | | | | 315/291 |
| 2016/0073475 | A1* | 3/2016 | Klein Swormink | H05B 47/11 |
| | | | | 315/151 |
| 2016/0286616 | A1* | 9/2016 | van de Ven | H05B 45/37 |
| 2017/0117963 | A1* | 4/2017 | Mueller | H04L 63/08 |
| 2018/0129493 | A1* | 5/2018 | Deixler | H05B 47/175 |
| 2020/0214109 | A1* | 7/2020 | Taipale | H05B 47/10 |

FOREIGN PATENT DOCUMENTS

| | | | | |
|---|---|---|---|---|
| WO | 2007034399 | A1 | 3/2007 | |
| WO | 2013164670 | A1 | 11/2013 | |
| WO | WO-2013164670 | A1 * | 11/2013 | H05B 33/0818 |
| WO | 2015032721 | A1 | 3/2015 | |
| WO | 2015116484 | A1 | 8/2015 | |
| WO | 2016142230 | A1 | 9/2016 | |
| WO | WO-2016142230 | A1 * | 9/2016 | G01J 1/0295 |
| WO | 2018158185 | A1 | 9/2018 | |

OTHER PUBLICATIONS

German Search Report issued for the DE Patent Application No. 10 2018 216 474.6, dated Jun. 26, 2019, 9 pages (for informational purposes only).

* cited by examiner

METHOD FOR ASSIGNING LIGHT SENSORS FOR REGULATING THE LIGHTING IN A LIGHTING SYSTEM

CROSS-REFERENCE TO RELATED APPLICATIONS

The present application is a national stage entry according to 35 U.S.C. § 371 of PCT Application No. PCT/EP2019/071306 filed on Aug. 8, 2019; which claims priority to German Patent Application Serial Nos. 10 2018 216 474.6 filed on Sep. 26, 2018; all of which are incorporated herein by reference in their entirety and for all purposes.

TECHNICAL FIELD

The present disclosure relates to a method for assigning light sensors for regulating the lighting in a lighting system in a space to be illuminated, said system comprising a first number of lighting groups, combining in each case one or more luminaires, a control device, which regulates the luminous flux of the respective lighting groups, and a second number of light sensors to be assigned to the lighting groups, the respective luminous flux being regulated with the aid of said light sensors, and to the corresponding control device.

BACKGROUND

Predominantly in publicly accessible buildings such as, for example, office blocks, sports halls or stadia, railroad stations or airports, factory halls or warehouses, etc., but increasingly in the private sphere as well, lighting systems are used which make possible respectively adapted artificial lighting depending on the lighting conditions that vary with the time of day as a result of the position of the sun and weather influences. For this purpose, suitably positioned light sensors are used which, in interaction with a light control, allow a regulation according to the principle of closed control loops if in the relevant space, for example, lighting conditions that are as constant as possible are desired or the decrease in the luminous flux of the light sources caused by ageing is intended to be automatically compensated for.

What is provided by the majority of the corresponding solutions that are commercially available is that in the case of closed spaces, for example, light sensors are arranged in a manner integrated in a luminaire or in the ceiling near a relevant luminaire and are oriented toward a reference surface situated vertically underneath as a rule, e.g. a desk surface or a floor area of the space to be illuminated, etc.

Inter alia, the daylight having an effect from outside the space through a window, for example, the artificial light of the integrated or near luminaire and, if appropriate, the artificial light of further luminaires in the space, if the latter are switched on, are incident on said reference surface. The light sensors detect in each case the light reflected by the corresponding reference surface. The light sensors and the luminaires are then coupled in such a way that the artificial lighting is subjected to regulation in which the resulting illuminance on the reference surface is kept approximately constant. By way of example, a lower limit of 500 1x is set, which must not be undershot, otherwise the luminous flux of the near luminaire or else of luminaires further away is readjusted (i.e. amplified), or if the limit is exceeded, the luminous flux, also for the purpose of saving energy, is readjusted, i.e. reduced.

Since the light-optical variables of luminance and illuminance, in the specific case, have proportions of artificial light and daylight that are variable depending on the time of day, a sufficient optical coupling between the measurement value detected by the respective light sensor and the resulting luminous flux must be ensured for a proper function of the control loop. In the simplest case this is done by a luminaire to be regulated being coupled to its integrated light sensor or the near light sensor. In more complex lighting systems or corresponding spaces, a plurality of luminaires are combined into lighting groups. The members of a lighting group are characterized by a mutually uniform luminous flux and a similar positioning in the space, for example by a similar distance from the window. Consequently, the influence of daylight is also similar here, and so a regulation adapted to one another is appropriate. One or more light sensors can be assigned to this lighting group.

The assignment is generally effected manually when a lighting system is started up. The manufacturer makes procedures available for this. The assignment is facilitated by the fact that the light sensor can be programmed externally via an IR (infrared) or NFC (Near Field Communication) interface.

For the luminaires of a specific group, the regulation can be carried out on the basis of just a few light sensors or even just a single light sensor, since the lighting conditions detected apply to all the luminaires of the group in a similar way. However, the classification of the luminaires of a space in lighting groups is effected purely subjectively as a rule and thus in a manner susceptible to errors with regard to the optical coupling.

In order to improve the energy saving, moreover, light sensors are often combined with a presence sensor system. These so-called combined sensors detect not only the luminance originating from the reference surface at a different wavelength (e.g. IR) but also the presence of persons in the space and thus allow the lighting in the space to be switched off after relatively long absence. Consequently, the positioning of these combined sensors is no longer effected exclusively according to the aspects of artificial light regulation, but rather is also dependent on the geometry of the space and the utilization of the space. In this regard, it may be necessary for some of these combined sensors for artificial light regulation to be positioned so unfavorably that an optical coupling to lighting groups is present only in a very limited way and during operation it turns out that the relevant light sensors in the combined sensors subsequently have to be selectively deactivated. This process, too, is purely subjective and susceptible to errors.

An additional factor is that in the case of extensive, large spaces to be illuminated, for instance factory halls, warehouses or airport halls having a length of up to 100 m or more, measurements of the luminance by light sensors at individual locations are no longer representative enough. In this case, often the detected measurement values of a plurality of light sensors together are assigned to a lighting group and averaged. For lack of objective criteria, it is obvious to carry out a simple (arithmetic) mean value formation over the measurement values for the detected luminance by way of the assigned light sensors. However, this can result in an inappropriately high overweighting of the measurement values of light sensors that are affected but are rather remote, and so also as a result of this subjective selection of light sensors for a weighting that is inappropriate as such, the optical coupling can at any rate hardly be improved, and in individual cases can even be worsened.

A check of the assignment can become possible by means of a real-time display of individual measurement values of light sensors, individual lighting groups being dimmed and the reaction at the light sensor being checked. In a similar way, mere flashlights are also used to illuminate light sensors at points and to observe the reaction of the lighting groups.

However, the measures mentioned remain time-consuming activities that are to be carried out purely manually, and are purely subjective and susceptible to errors. Furthermore, in cases that involved carrying out only a spatial reconfiguration with an influence on the lighting conditions, the outlay for a further manual start-up is comparatively high.

SUMMARY

It is therefore an object to develop a generic method for assigning light sensors for regulating the lighting in a lighting system in such a way that both the susceptibility to errors and the outlay for the assignment of light sensors to lighting groups are reduced and the optical coupling attained here between the light sensors and the lighting groups is optimized.

The object is achieved by means of a method for assigning light sensors for regulating the lighting in a lighting system having the features of patent claim 1 and also by means of a corresponding control device as claimed in patent claim 18. The dependent claims relate to advantageous developments of the method.

The starting point is a method for assigning light sensors for regulating the lighting in a lighting system in a space to be illuminated, said system comprising a first number of lighting groups, combining in each case one or more luminaires, a control device, which regulates the luminous flux of the respective lighting groups, and a second number of light sensors to be assigned to the lighting groups, the respective luminous flux being regulated with the aid of said light sensors. The number of light sensors and lighting groups can be identical or different, and more light sensors than lighting groups can be present, and alternatively fewer. The space can be any closed (factory halls, office areas, regions of airports or railroad stations, etc.), half-open (e.g. football stadia, open halls, open-air theaters, etc.) or completely open objects (e.g. illuminated gardens).

The method furthermore comprises the following steps: switching the lighting of the lighting system into a first switching state such that a first lighting group emits light with a predetermined luminous flux and—subsequently or previously—switching the lighting of the lighting system into a second switching state such that the first lighting group emits light with a reduced luminous flux by comparison with the predetermined luminous flux or emits no light, wherein in the first and second switching states, i.e. in both cases in the meantime, in each case a luminance of the light reflected by a reference surface respectively assigned to the light sensors in the space is measured with the aid of the light sensors—for the purpose of detecting in each case a first measurement value in the first switching state and a second measurement value in the second switching state.

Here the switching into the first switching state can include switching on the first lighting group but also switching off other lighting groups from a previously switched-on state. What is important is that the illumination of the space is determined principally by the first lighting group; the other lighting groups are thus as far as possible completely or partly switched off or e.g. at least reduced in power.

In terms of the basic concept of the method, embodiments are also encompassed in which the other lighting groups are switched on or off arbitrarily (also in mixed fashion). For the step of difference formation to be described below, what is crucial is only that the other lighting groups in the first and second switching states are activated or deactivated or remain switched in an unchanged manner, such that their contributions cancel one another out in the subsequent difference formation.

It should be noted that switching into the second switching state can also include switching off the first lighting group but also switching off other lighting groups from a previously switched-on state, etc. The previous switching state is not relevant here since only the measurement during the switching state matters. If the switching state from which the first or second switching state is brought about is by chance identical with the respective switching state, then the "switching" includes merely verifying the desired switching state.

The light sensors distributed suitably in the space each measure a luminance of the light reflected by a reference surface respectively assigned spatially to the light sensors. The reference surfaces can each be different, for example table, wall or floor surfaces. Consequently, they detect in each case a first measurement value in the first switching state and a second measurement value in the second switching state. Since a difference formation and a comparison are subsequently carried out, as described, a suitable normalization may be required with regard to the detected measurement values themselves or with regard to the difference values formed, in order to ensure the comparability of the values among one another for the light sensors present in the space. One example would be mapping onto a percentage scale proceeding from maximum lighting corresponding to 100%.

The subsequent step relates to forming a difference value from the first and second measurement values for each of the light sensors. In other words, the difference formation quantifies the influence of the switched-on first lighting group, by comparison with the switched-off (or power-reduced) first lighting group, on the illumination of the space at the positions of the light sensors or, more precisely, at the reference surfaces thereof. A high difference value indicates a large influence and thus a stronger optical coupling to the affected (here: first) lighting group, whereas a low difference value indicates a weak optical coupling.

The difference values formed are then present in each case for all evaluated light sensors. These values are compared among one another in the next step. This allows a prioritization in the selection of light sensors for the assignment to the first lighting group. A subsequent step then includes assigning at least one of the light sensors to the first lighting group depending on the result of the comparison, and storing the assignment. The light sensor(s) thus selected has (have) then been found to be suitable for the optical coupling and is (are) stipulated for the regulation of the lighting by the first lighting group.

Consequently, the first lighting group can be regulated to a constant illuminance on the affected reference surface(s) in a control loop with the aid of the measurement values continuously detected by the assigned light sensor(s) during normal operation.

The method can be preceded by grouping luminaires in lighting groups for example in the context of a start-up or internal regrouping. The grouping of the luminaires for artificial lighting is effected according to the requirements mentioned in the introduction (e.g. distance from the window, etc.).

The method allows an automated assignment of light sensors to lighting groups. By virtue of the fact that two switching states are realized in each case successively for one, many or all of the lighting groups of the lighting system, in which switching states the lighting only of the affected lighting group changes, the influence thereof on the light sensors and thus the quality of the optical coupling can be quantified according to objective standards. It becomes possible, by means of the difference formation ("previously" versus "afterward"), to obtain values which are comparable with one another, such that the light sensors can be compared to one another and one or more of these light sensors can be selected from this comparison for the assignment. Manual interaction—hence possibly beset by errors—is not required. The choice of the sensors with the best optical coupling is thus improved, the outlay as a result of the automation is reduced and the susceptibility to errors is avoided.

Consequently, the method is advantageous in particular for implementation in lighting systems in which communication between the connected luminaires and light sensors is effected via bus systems, thus for instance one according to the DALI protocol ("Digital Addressable Lighting Interface"). This communication standard is defined in the family of IEC standards IEC 62386 and IEC 60929, appendix E, and is based on the earlier DSI standard (Digital Signal Interface) and closes the gap between the conventional, analogue 1-10 V interface and complex digital bus systems such as KNX/EIB (European Installation Bus) or LON (Local Operating Network). The latter are likewise advantageously suitable for the implementation of the method. In this case, the method can be implemented as an executable program in a control device (control unit) of the bus, which can address the light sensors and the luminaires combined into lighting groups, detect the measurement values by way of the addressed light sensors and form the difference values by internal processing.

Furthermore, in accordance with a further modification, it is possible and conceivable, in principle, by comparing the difference values of the light sensors respectively selected as an optimum solution for the lighting groups, to determine those lighting groups whose best comparison result is still insufficient. For this one lighting group or this plurality of lighting groups, in a further step it is even possible to vary the grouping of the luminaires (e.g. exchange of the membership of one luminaire in a lighting group for another luminaire in spatial proximity, for example, or mere addition or removal of a luminaire), in order then to initiate the present method once again as a test. If an improvement in the relevant optical coupling occurs (represented by a higher difference value), the new grouping can be stored, otherwise it is rejected and, if appropriate, a different regrouping is attempted. Consequently, the entire lighting system can optimize itself in an automated manner. Such a test run could be carried out upon start-up, or during normal operation at night. The use of a digitally addressable bus system would be particularly advantageous here at any rate.

According to one development, the at least one light sensor is assigned to the first lighting group if the comparison reveals that the relevant difference value is the highest among the difference values formed. The highest difference value corresponds to the maximum optical coupling, such that a particular advantage occurs in this case.

According to a further development, at least one second light sensor is assigned to the first lighting group if the relevant difference value formed from the measurement values detected by it lies within a predetermined interval distance from the highest difference value. In this case, it is advantageously possible to assign two or more light sensors to the lighting group, the optical coupling of which proves to be at least similar. In this case, it is suitable to carry out an averaging of the detected measurement values during normal operation—optionally with a weighting (see below)—with an improvement in the quality of the detection by a plurality of light sensors. Expressed the other way around, this aspect of the method prevents the assignment of poorly coupled light sensors which are irrelevant to the current lighting group.

According to a further development, at least one second light sensor is assigned to the first lighting group if a size of the first lighting group exceeds a predetermined third number of luminaires. If there is an increasing number of luminaires in a group, then the affected spatial extent necessarily increases as well. This can be taken into account by an assignment of further light sensors, such that the optical coupling is further improved. The predetermined third number thus represents a threshold value, upon the exceedance of which the assignment is effected.

According to a further development, in the step of switching the lighting of the lighting system into the first switching state, the luminous flux of all lighting groups other than the first lighting group is switched off or remains switched off, or is alternatively only reduced or remains reduced to a low dimming value. In this case, the light influences caused by third sources that are disturbing for a measurement are reduced. In the practical implementation, e.g. the other lighting groups can be dimmed to minimal luminous flux instead of being switched off: this has the advantage that no part of the space becomes completely dark and as a result, if appropriate, a person starting operation is not in darkness if this is carried out at night.

According to a further development, in the step of switching the lighting of the lighting system into the second switching state, the luminous flux of all the lighting groups is switched off or remains switched off, or alternatively is reduced or remains reduced to a low dimming value (see above). In this case, too, the light influences caused by third sources that are disturbing for a measurement are reduced.

According to a further development, the steps of switching both into the first switching state and into the second switching state are carried out under conditions in which light sources other than those of the lighting groups are suppressed, in particular daylight. In this case, disturbing light influences are reduced further.

According to a further development, in a case in which at least two light sensors are assigned to the first lighting group, depending on the comparison result of the difference values only of the assigned light sensors in each case weighting factors used for the regulation of the lighting group are set on the basis of the measurement values continuously detected during normal operation. The weighting factors are thus set according to objective aspects, namely according to the comparison of the optical coupling between the light sensors involved. A light sensor with optical coupling proven to be better contributes more to the regulation than some other light sensor with likewise good, but somewhat lesser, optical coupling. The further light sensor nevertheless contributes to a more appropriate regulation behavior by virtue of its different position in the space. The use of a plurality of sensors per lighting group nevertheless makes the regulation less sensitive to temporary disturbances. One example would be if a vehicle is parked in front of the window which is near a sensor, then the proportion of daylight changes considerably for the sensor, even though, precisely in the case of elongated spaces with large window areas, the effect of the disturbance as seen for the lighting conditions overall is much smaller. The effect of the disturbance can for example be halved with two sensors in the group, be reduced to a third with three sensors, etc.

According to a further development of the abovementioned aspect, the respective weighting factors obey a function which yields a higher weighting factor for a comparatively higher difference value, and the other way around yields a lower weighting factor for a comparatively lower difference value. This aspect contributes further to an improved optical coupling.

According to a further development, the steps of the method are carried out successively for all the lighting groups. As mentioned above, this allows an automated group assignment of the light sensors to the lighting groups of the lighting system. The method can advantageously be carried out in a closed manner in an automated pass upon start-up or outside normal operation, e.g. at night. Superfluous light sensors can advantageously be deactivated or saved or repositioned.

According to a further development, carrying out the steps of the method during normal operation of the lighting system is initiated by an event. This aspect advantageously allows the recurrent updating of the assignments of the light sensors of the lighting system, as a result of which, in particular, changes in the lighting conditions in the space to be illuminated are taken into account.

According to a further development, the event is the setting and storage of a new regulation setpoint value in the control device of the lighting system. The new regulation setpoint value for the illuminance represents a new state of lighting conditions to be established, such that it is possible to react directly and dynamically here by virtue of the method making it possible to record new measurement values and to compare the differences in order to optimally set the assignment.

According to a further development, the event is a manual switching process of the lighting by way of a pushbutton or an automatic switching process by way of a motion detector or a time switch. The initiation for carrying out the method can also be instigated manually, such that from normal operation it is possible to effect a continuous adaptation of the system. With a real-time clock, likewise over periods of time it is possible to achieve a periodic updating of the group assignments at a suitable point in time (e.g. at night) and thus a dynamic adaptation to changed lighting conditions.

According to a further development, the difference values formed from the detected measurement values when the steps of the method are carried out after initiation by an event are compared with such difference values which, when the steps of the method were carried out earlier, led to a new assignment of at least one light sensor to a lighting group and storage of this assignment in the control device. The light sensor is assigned anew and the assignment is stored then only if a change in the difference values in the comparison exceeds a predetermined threshold value. This aspect ensures a stable system, which otherwise, in the case of only temporary and slight changes in the lighting conditions, might jump between different states of the group assignment, which might be perceived as unpleasant by the users of the spaces.

According to a further development, the steps of the method are carried out by the control device or the control unit of the lighting system. As explained above, this aspect allows the automatic self-optimization of the lighting system, without an interaction that is susceptible to errors becoming necessary.

According to a further development, the luminaires and the light sensors of the lighting system are connected to a control device in an individually addressable manner via a common data bus, such as a DALI or KNX bus, and wherein the combination of the luminaires into lighting groups and the assignment of the light sensors to the lighting groups are/is stored in a cache memory of the control device. This construction further improves the abovementioned aspect.

A control device may be used for assigning light sensors for regulating the lighting in a lighting system in a space to be illuminated, said system comprising a first number of lighting groups, combining in each case one or more luminaires, the control device, which additionally regulates the luminous flux of the respective lighting groups, and a second number of light sensors to be assigned to the lighting groups, the respective luminous flux being regulated with the aid of said light sensors, wherein the control device is configured for carrying out the following steps:

switching the lighting of the lighting system into a first switching state such that a first lighting group emits light with a predetermined luminous flux;

switching the lighting of the lighting system into a second switching state such that the first lighting group emits light with a reduced luminous flux by comparison with the predetermined luminous flux or emits no light;

in the first and second switching states in each case measuring a luminance of the light reflected by a reference surface respectively assigned to the light sensors in the space with the aid of the light sensors for the purpose of detecting in each case a first measurement value in the first switching state and a second measurement value in the second switching state;

forming a difference value from the first and second measurement values for each of the light sensors;

comparison of the difference values formed for each of the light sensors among one another, and assigning at least one of the light sensors to the first lighting group depending on the result of the comparison, and storing the assignment, such that the first lighting group can be regulated to a constant illuminance on the affected reference surface(s) in a control loop with the aid of the measurement values continuously detected by at least the assigned light sensor during normal operation.

The same advantages as described initially are present here.

Further advantages, features and details of the invention are evident from the claims, the following description of non-limiting embodiments, and with reference to the drawings. In the figures, identical reference signs designate identical features and functions.

BRIEF DESCRIPTION OF THE DRAWINGS

Identical, similar or equivalent elements are provided with the same reference signs in the figures. The figures and the proportions of the elements represented in the figures among each other are not to be considered as true to scale. Rather, individual elements may be oversized for better representability and/or for better comprehensibility.

DETAILED DESCRIPTION

Figure 1:
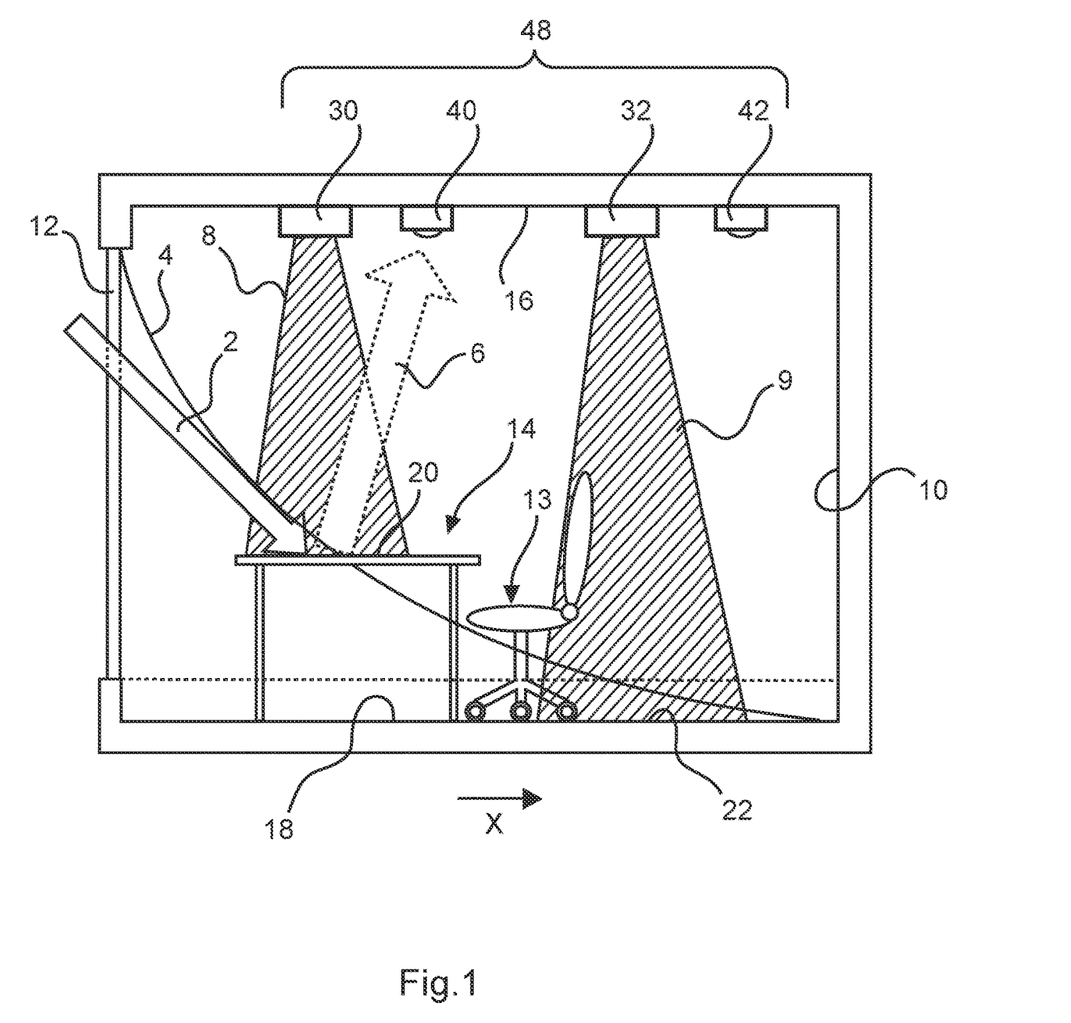
FIG. 1 shows a schematic illustration for elucidating the functional principle of lighting regulation.

FIG. 1 shows, in a schematic illustration, the functional principle of lighting regulation in a space 10, which is for example an office space with chair 13 and table 14 (e.g. a desk) installed therein. Via a window 12, daylight 2 varying depending on the time of day and weather situation can be introduced, which is indicated schematically by an arrow in FIG. 1 and—excluding artificial light—brings about in the space, in a way that is rendered very roughly, a brightness distribution 4 that decreases with increasing distance X from the window 12. Shadows cast by furniture and partition walls also play a part here, of course. In the example, the space 10 has a space ceiling 16 and a floor 18, numbers of luminaires (not shown in detail in FIG. 1) combined into a first and a second lighting group 30 and 32, respectively, being arranged in each case in the space ceiling. The sectional view in FIG. 1 shows only two lighting groups; of course, more than only two lighting groups can also be present. The luminaires of the lighting groups 30, 32 emit light with a directional characteristic, wherein the light of the first lighting group 30 is partly incident on a surface of the table 14 and light of the second lighting group 32 is at least partly incident on the floor 18 of the space 10.

First and second light sensors 40, 42 are arranged on the space ceiling 16 in direct proximity respectively to the luminaires of the lighting groups 30, 32. Said light sensors can detect that reflected light 6 which is reflected by a respective reference surface 20 on the table 14 and reference surface 22 on the floor 18, which is indicated by a corresponding arrow in a non-limiting way only for the first light sensor 40 in FIG. 1.

The aim of the lighting regulation is to keep constant the illuminance of the reference surfaces 20 and 22 respectively detected by the two light sensors 40, 42, independently of how much daylight is incident. The first light sensor 40 is therefore assigned to the first lighting group 30, and the second light sensor 42 is assigned to the second lighting group 32, in order to establish respectively separate control loops and to enable an optical coupling between both. "Assigned" here generally means that the first light sensor 40 and the first lighting group 30 are connected either directly (optionally even in an analogue manner) or via a digital bus with corresponding control and logic combination such that the light sensor provides the measuring element, a control device provides the regulator, the lighting group provides the actuator and the reference surfaces provide the regulated system in accordance with the principles of regulation by closed-loop control.

In the specific exemplary embodiment, without restricting the generality, a two-core digitally addressable, DALI-compatible bus system is used, to which the light sensors 40, 42 and the luminaires of the lighting groups 30, 32 are connected in each case in an individually addressable and hence controllable or retrievable manner. The control device here can be the usually used control unit of the DALI bus system.

The assignment shown in FIG. 1 can be carried out upon start-up or later and in accordance with the exemplary embodiment of a method. The first light sensor 40 is positioned substantially vertically (or at least obliquely vertically) above the reference surface 20, which is also illuminated by the artificial light 8 of the first lighting group in addition to the daylight 2. The same correspondingly applies to the second light sensor 42 and the second lighting group 32. FIG. 1 already suggests a sufficient optical coupling as a result of the spatial proximity, that is to say that if e.g. the contribution by the daylight increases or decreases, this is detected in the form of measurement values by the light sensors 40 and 42, respectively, as a result of which, in the context of the regulation, the lighting groups 30, 32 are in each case correspondingly readjusted with regard to their luminous flux such that the illuminance of the reference surface, which actually changes as a result of the variation, is compensated for or kept constant.

Figure 2:
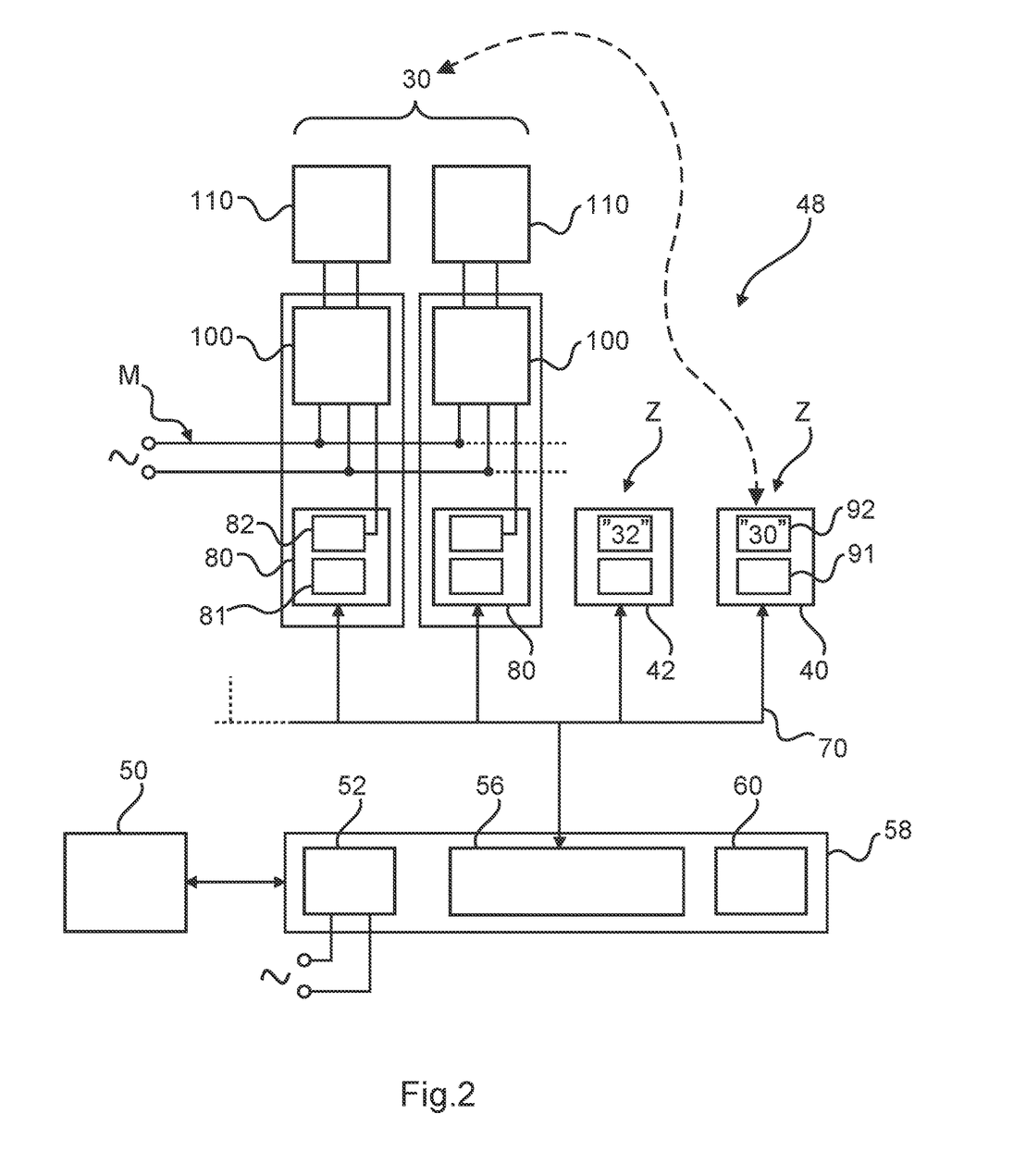
FIG. 2 shows, in a schematic block diagram, a schematic set-up of a lighting system in which the method for assigning light sensors can be carried out.

FIG. 2 shows, in a schematic illustration, a block diagram of a lighting system 48 compatible with the example shown in FIG. 1. The lighting system 48 comprises a number of luminaires 110 containing for example LED modules having one or more LEDs (light emitting diodes) or fluorescent lamps, etc., which in each case (or else jointly), by way of an electronic ballast (EVG) 100, are supplied with suitably conditioned power from a power supply system current line M (with alternating current (AC) at 230 volts, for example), to which they are connected. The electronic ballast 100 can have EMC filters, rectifiers, power factor correction and, depending on the type of luminaire, further electronic components that are specifically known to the person skilled in the art, but are not essential to the method.

Control for the purpose of varying the output power or monitoring the electronic ballasts 100 and luminaires 110 is effected in each case by unit parts 80 (the ballasts 100 and the unit parts 80 form operating units) having a microcontroller 82 with memory and an interface 81 for connection to a signal bus 70, which, in this exemplary embodiment, is embodied as a DALI communication bus (standard of the IEC 62386 family) and has a 2-core line. The DALI communication bus 70 connects the interfaces 81 of the unit parts 80 to an interface 56 of a control unit 58. For this purpose, the control unit also has a microcontroller 60 with memory. Furthermore, the control unit 58 has a power supply device 52 for supplying the control unit 58 with power (e.g. 230 V AC). On the output side, it is connected to the signal bus 70 and feeds in there a DC voltage of e.g. 16-17 V.

In addition to the power supply device 52 and the interfaces 56, 81 of the control and operating units, the DALI communication bus 70 also has connected to it interfaces 91 of sensors or actuators, of which only the two light sensors 40, 42 are shown here. The latter furthermore also have a microcontroller 92 with memory, but do not require a power supply system connection, for example, since the power fed via the DALI communication bus 70 may be entirely sufficient.

A control or supervisory device 50 such as, for instance, a PC, or a smartphone or tablet, etc., is connected to the control unit 58 and allows an interaction by the user of the lighting system 48. The control or supervisory device 50 can instigate the communication of transmission signals to the operating units or the light sensors 40, 42, etc., and also receive and evaluate signals sent by them and obtained via the interface 58. The signals transmitted by the sensors other than the light sensors 40, 42 can include for example information pertaining to the surroundings such as time, temperatures, moisture, pressure, stress/voltage or further mechanical or electrical variables, etc. The signals instigated by the control unit 58 can include control information such as, for instance, the retrieval of status information such as dimming position (present brightness value), operating duration, lamp faults, the activation of a power supply system voltage switch in the operating unit 80, changed dimming values or the activation of stored scenes, new group assignments (configuration), etc.

The light sensors 40, 42 shown by way of example in FIG. 1 each have their memory assigned to the microcontroller 92, in which memory an assignment Z is in each case stored, which is effected not only upon start-up by way of NFC or IR programming (as described initially), but also for example by way of the measurement and evaluation program made available with the aid of the control unit 58, which can dynamically overwrite (i.e. update) values stored in that memory. The assignment shown in FIG. 1 is reflected schematically in FIG. 2 by the entry "30" (representing the two luminaires 110 combined into the lighting group 30 in FIG. 2) in the memory of the microcontroller 92 of the light sensor 42. The double-headed arrow depicted by a dashed line in FIG. 2 likewise schematically indicates this assignment. The light sensor 40 is assigned in FIG. 2 to the lighting group 32, no longer illustrated there (entry "32" in the relevant memory).

During regulating operation, the light sensors 40, 42 thus detect the measurement values corresponding to the respective luminance and communicate them on the DALI signal bus 70, following which the luminous flux of relevant luminaires 110 is regulated by the lighting groups 30, 32 addressed via the assignment Z such that a setpoint value for the illuminance of the light 6 reflected by the reference surface is complied with.

For the exemplary lighting system 48 illustrated in FIGS. 1 and 2, which is operated with lighting regulation, an exemplary sequence for a method will now be explained in a flow diagram with reference to FIGS. 3A and 3B. The steps of the method are controlled from the control unit 58.

Figure 3A:
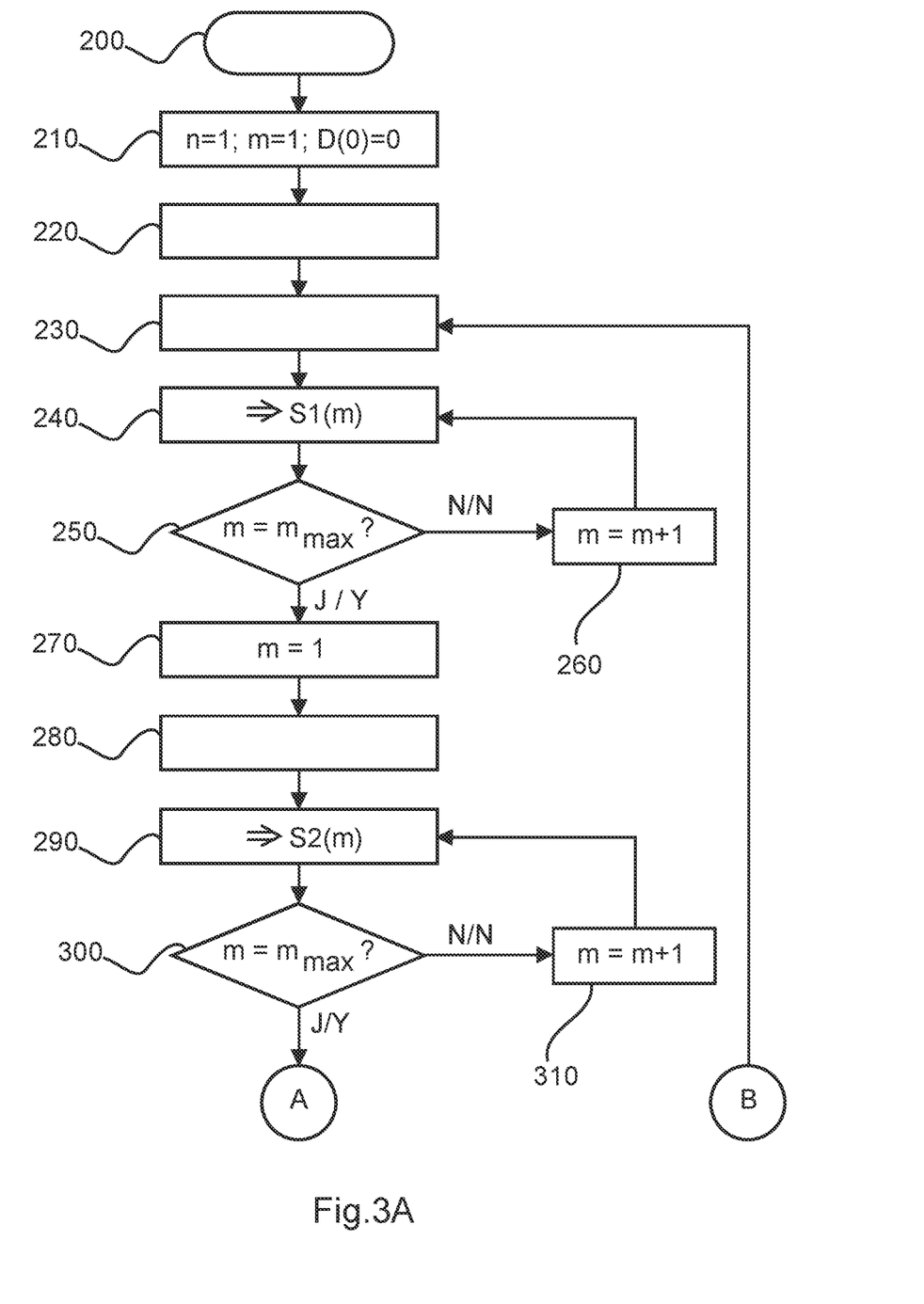
FIGS. 3A and 3B show, in a flow diagram, a schematic sequence of the method.

In FIG. 3A, the method or the program or the application is started in step 200. The start can be triggered by an event. By way of example, a signal addressed to the control unit can be output by a unit connected to the signal bus 70, for instance a pushbutton or a real-time clock (not shown), which signal initiates the start of the program sequence. The method is carried out at night or at least in the darkened state of the space 10.

In step 210, variables and parameters are initialized, the counting parameter n=1 for the first lighting group 30 chosen, the counting parameter m=1 for the first light sensor 42 chosen, and the variable D(m=0)=0 for the detected difference value for the illuminance respectively measured. Furthermore, maximum values $n_{max}$ for the total number of lighting groups and $m_{max}$ for the total number of light sensors are determined and set and the measurement value variables S1(m) and S2(m) for the detected values of the illuminance are initialized in each case in the switched first switching state and in the switched second switching state of the lighting system 48.

In step 220, the entire artificial lighting by all the lighting groups is switched off, that is to say that all luminaires 110 etc. of same are switched off or dimmed to minimum %. If the luminaires have already been switched off or dimmed to minimum % for other reasons, this state is merely verified in that step. In step 230, all luminaires of only one lighting group 30 where n=1 are switched on or dimmed to a maximum of 100%. This then defines a first switching state of the lighting system 48.

In step 240, the light sensor 40 where m=1 detects a measurement value S1(m=1) for the illuminance, or more precisely: the control unit retrieves the present measurement value from the light sensor where m=1.

In the branch 250 describing a loop, a check is made to ascertain whether the counting parameter m for counting up the light sensors has reached the maximum number $m_{max}$ of light sensors. If this is not yet the case (N/N), then the sequence branches to step 260, where the counting parameter m is incremented by one, and back to step 230, in order to detect the measurement value S1(m=2) for the second light sensor 42 in the first switching state. The loop (240, 250, 260) is then iterated for all counting parameter values of m (i.e. for all light sensors) until the condition $m=m_{max}$ is met, i.e. all light sensors have detected their measurement values S1(m) in the first switching state for the first lighting group 30. At this point in time the second light sensor 42 may still be assigned to the second lighting group 32 (see FIG. 1), but in the present case this assignment is checked by the program and possibly overwritten. If the condition is met (J/Y for yes), the program branches to step 270.

In step 270, the parameter m is reset to m=1 again, in order to begin the detection of measurement values in the second switching state.

In step 280, the entire artificial lighting by all the lighting groups is switched off, that is to say that all luminaires 110 etc. of same are switched off or dimmed to 0%. As a result, since previously only the luminaires 110 of the first lighting group 30 were switched on or dimmed to 100%, here only the luminaires of the first lighting group are switched off, and nothing changes for the other luminaires; they remain switched off. This then defines the second switching state of the lighting system 48—no luminaire is switched on; the space is substantially dark in this specific example.

In step 290, the light sensor 40 where m=1 detects a measurement value S2(m=1) for the illuminance, or more precisely: the control unit retrieves the present measurement value from the light sensor where m=1.

In the branch 300 describing a loop again, a check is made to ascertain whether the parameter m for counting up the light sensors has reached the maximum number $m_{max}$ of light sensors. If this is not yet the case (N/N for no), then the sequence branches to step 260, where the parameter m is incremented by one, and back to step 230, in order to detect the measurement value S1(m=2) for the second light sensor 42 (where m=2) in the second switching state. The loop (290, 300, 310) is then iterated for all counting parameter values of m (i.e. for all light sensors) until the condition $m=m_{max}$ is met, i.e. all light sensors have detected their measurement values S2(m) in the second switching state for the first lighting group 30. If the condition is met, the program sequence advances to step 320.

Figure 3B:
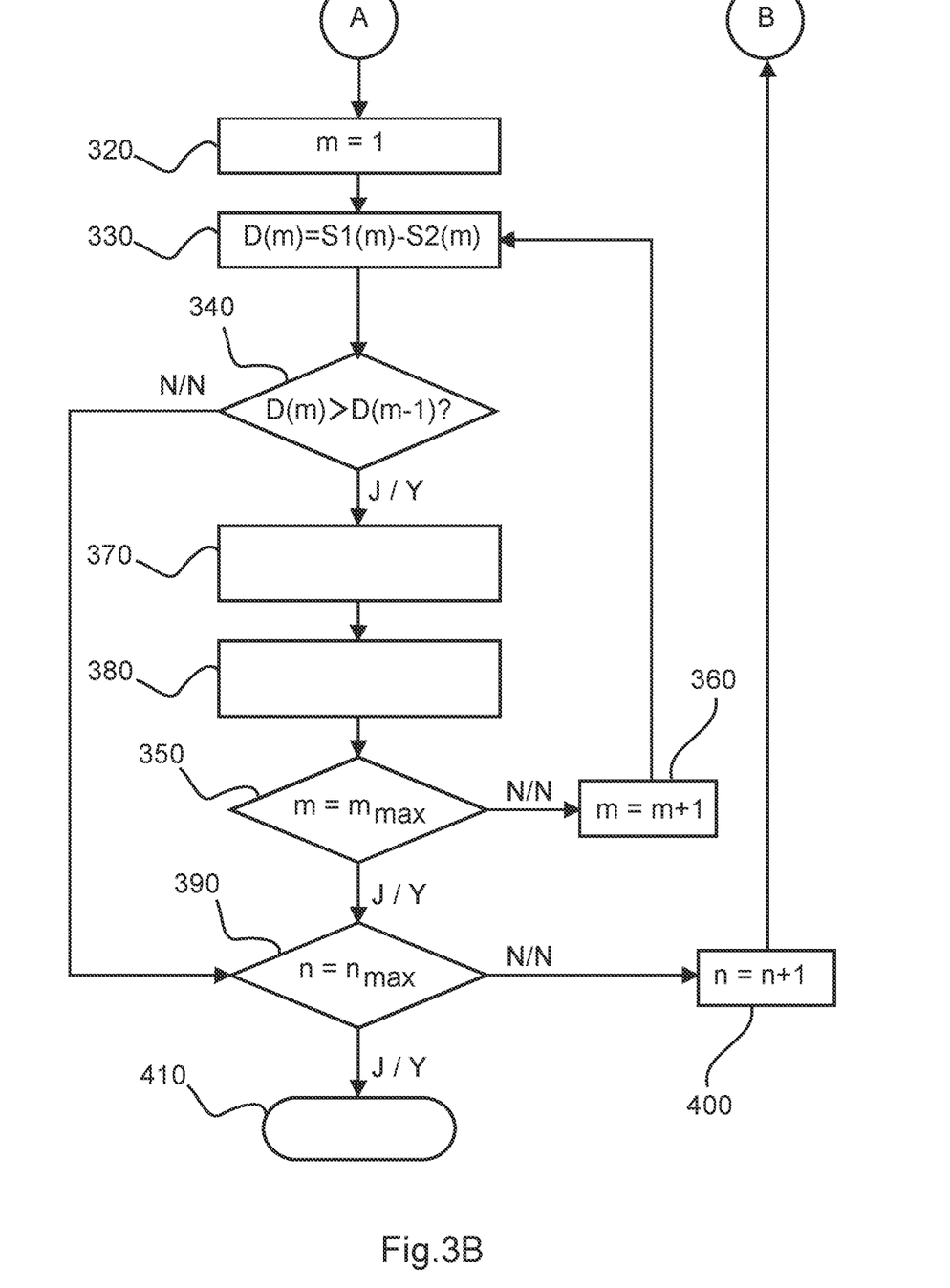

The sequence continues via the marking point "A" in FIG. 3B. In step 320, the parameter m is reset to m=1 again (that is to say that the sequence begins with the first light sensor 40), in order then to begin a difference value formation.

In step 330, for the light sensor 40 where m=1, the difference D(m=1)=S1(1)−S2(1) is formed from the measurement values detected by it in the first and second switching states, i.e. in a state in which luminaires of only the first lighting group have a luminous flux, and a state in which all the lighting groups are switched off.

In the branch 340, a check is made in a comparison to ascertain whether this difference is greater than a corresponding value determined in the previous iteration of the loop. Since this is the first pass for the first light sensor 40 where m=1, and D(0)=0 was set in the initialization, the condition as a rule is met (J/Y for yes). The program sequence branches to step 370.

In step 370, the existing assignment of light sensors to the first lighting group 30 where n=1 is then deleted.

In the subsequent step 380, the present light sensor 42 where m=1 is assigned to this lighting group 30 where n=1. However, this assignment, too, is still temporary at this point in time since the loop (330, 340, 350, 360, 370, 380) serves to search for that light sensor with the highest difference value D(m).

Firstly, a check is then made to ascertain whether the sequence has passed through all the light sensors (N/N for no), which is not yet the case for m=1, such that the counting parameter m is incremented (m=2 and light sensor 42). After difference value formation D(m=2)=S1(2)−S2(2) thereof, in the comparison of the branch 340 a check is made to ascertain whether this newly formed difference value is greater than that of the light sensor 40 where m=1. If this is not the case (N/N for no), after the further branch 350 and step 360 a corresponding loop is iterated for the next light sensor where m=3.

It is only if an in each case comparatively even greater difference value is found that the comparison condition in the branch 340 is met (J/Y for yes), and the program sequence branches off to steps 370 and 380 in order to delete the previous assignment and to carry out the new assignment. In this way, the light sensor with the comparatively highest difference value will remain assigned at the end of the loop and program pass at $m=m_{max}$ (and $n=n_{max}$).

This sequence is then repeated via the branch 390, in which a check is made to ascertain whether the counter n for the lighting groups has already reached $n_{max}$, and via the incrementing step 400 where n=n+1 for the next lighting groups, including the second lighting group 32 where n=2, this step being taken in the case of the check being negative (N/N). At the end each lighting group is assigned a light sensor which yields the highest difference value specifically for this lighting group.

In the final step 410, the assignments that may possibly have been stored only temporarily are stored in a table in the memory of the microcontroller 60 of the control unit 58, and/or are written to the memories of the corresponding microcontrollers 92 of the light sensors 40, 42 etc. via the signal bus 70, and the program is ended.

If the program sequence is carried out during normal operation, at this point the entire lighting can be released again for prescribed operation (e.g. with regulation). The duration of the pass can be a few seconds.

The claimed invention is not restricted to the specific exemplary embodiment and further alternatives, alterations or modifications are possible. By way of example, the program can also be executed in other lighting systems that are not based on a DALI signal bus.

Furthermore, the specific and nevertheless simplified exemplary embodiment is set up such that in each case only ever exactly one light sensor is assigned to the different lighting groups. Modifications provide that e.g. two or more light sensors can also be assigned. This can also involve those two or more light sensors which yield the respective highest two or more difference values in a ranking list among the difference values formed and are therefore the highest up therein.

In this case, it is also possible for the assignment of individual light sensors to be specified, that is to say for the latter to be excluded from the new assignment, if the assignment thereof is manifested e.g. only under specific conditions, but is then indispensable. The specification prevents deletion in the program sequence.

It is also possible for the program to carry out an assignment of more than just one light sensor depending on the present size of a lighting group. Larger lighting groups can correspond to a larger spatial extent, and so the assignment of a plurality of light sensors can be helpful for adequately detecting the light distribution in the space 10.

Furthermore, it can be provided that if a specific difference value D(m) in the comparison in the branch 340 is only insignificantly greater than the difference value D(m'≠m) that is still currently the highest at the point in time of this loop iteration, i.e. if the difference between the two difference values lies within a predetermined interval, the previous assignment is not deleted, but rather remains, and only a new assignment is added for the light sensor with the even higher difference value. In other words, two light sensors with similar optical coupling are both assigned to the present lighting group in this case.

In the abovementioned cases of a plurality of light sensors assigned to only one lighting group, by means of the method or the program it is additionally possible, particularly advantageously, to assign or to carry out a weighting of the measurement value detection between the light sensors during the regulation. A weighting function can be predefined which is dependent on the difference value respectively formed and rises with the latter. By way of example, if the difference value of a light sensor is double the magnitude of that of a second assigned light sensor, it is possible to carry out the weighting in a ratio of 2:1.

It should furthermore be noted that the claimed invention is also not restricted to the specific step sequence of the sequence illustrated in FIGS. 3A and 3B. The two switching states can also be set in the opposite order. Furthermore, it is also possible to call the measurement values from all the light sensors simultaneously (broadcast retrieval).

Moreover, the search for the highest difference value can be realized by fast table algorithms, instead of by comparison in loops, etc.

Furthermore, it is not absolutely necessary for all lighting groups apart from the one currently under consideration to be switched to be completely dark. By way of example, the lighting signature of a space could conceivably also be determined indirectly by in each case only ever one lighting group being switched off, while all the others remain switched on.

In the exemplary embodiments, it is also not absolutely necessary, although advantageous, to choose maximum lighting or a dimming value of 100% for the one lighting group switched on, or to attenuate the "switched-off" or darkened lighting groups completely to 0%. Rather, in the cases mentioned, the control unit can take account of the light contributions in each case and thereby deduce (for example by addition or subtraction depending on the application) the ideal case of completely switched-off lighting groups.

Furthermore, a modification of the exemplary embodiment shown in FIGS. 3A, 3B provides for storing assignments of light sensors to lighting groups obtained earlier, including the underlying difference value formations, and for comparing the latter with those of a present program pass. If only slight changes below a predefined threshold value arise, the present new assignment is rejected and not stored, which makes the regulation of the lighting system more stable vis a vis momentary fluctuations of the lighting conditions in the event of the program sequence being carried out frequently or regularly and protects the state of health of the users of the affected space.

LIST OF REFERENCE SIGNS

2 Daylight
4 Light distribution (daylight)
6 Reflected light
8 Artificial light
9 Artificial light
10 Space
12 Window
13 Chair
14 Table
16 Space ceiling
18 Floor
20 Reference surface (table)
22 Reference surface (floor)
30 First lighting group
32 Second lighting group
40 First light sensor
42 Second light sensor
48 Lighting system
50 Control or supervisory device (PC)
52 Power supply
56 Interface (DALI)
58 Microcontroller with memory
60 Control unit
70 Signal bus (DALI)
80 Unit part of an operating unit
81 Interface (DALI)
82 Microcontroller with memory
91 Interface (DALI)
92 Microcontroller with memory
100 Ballast (e.g. for LEDs)
110 Luminaire
200—Program steps
410
200 Program start
210 Initialization parameters n=1, m=1, D(0)=0
220 Artificial light: all groups OFF
230 Lighting group n: ON
240 Light sensor m: detect measurement value S1(m)
250 Condition m=$m_{max}$ met?
260 Incrementing m=m+1
270 Resetting: m=1
280 Artificial light: all groups OFF
290 Light sensor m: detect measurement value S2(m)
300 Condition m=$m_{max}$ met?
310 Incrementing m=m+1
320 Resetting: m=1
330 Forming difference value D(m)=S1(m)−S2 (m)
340 Comparison of the difference values
350 Condition m=$m_{max}$ met?
360 Incrementing m=m+1
370 Deleting the existing light sensor assignment
380 Assigning the light sensor m
390 Condition n=$n_{max}$ met?
400 Incrementing n=n+1
410 Storing and end
M Voltage supply
Z Assignment (via NFC, IR or DALI)

The invention claimed is:

1. A method for assigning a plurality of light sensors for regulating the lighting in a lighting system in a space to be illuminated, said lighting system comprising:
a plurality of lighting groups, where each lighting group of the plurality of lighting groups comprises one or more luminaires,
a control device configured to regulate a luminous flux of each lighting group of the plurality of lighting groups, and
a plurality of light sensors where each light sensor of the plurality of light sensors is assigned to each lighting group of the plurality of lighting groups, the luminous flux of each lighting group being regulated by a corresponding light sensor of the plurality of light sensors,
wherein the method comprises:
switching the lighting of the lighting system into a first switching state such that a first lighting group of the plurality of lighting groups emits light with a predetermined luminous flux;
switching the lighting of the lighting system into a second switching state such that the first lighting group of the plurality of lighting groups emits light with a reduced luminous flux by comparison with the predetermined luminous flux or emits no light;
measuring a luminance of the light reflected by a reference surface by all of the light sensors of the plurality of light sensors in the space to determine a first measurement value in the first switching state and a second measurement value in the second switching state for all of the light sensors of the plurality of light sensors;
determining a difference value from the first and second measurement values for each light sensor of the plurality of light sensors;
comparing all of the difference values determined for each light sensor of the plurality of light sensors to each other, and
assigning at least one light sensor of the plurality of light sensors to the first lighting group of the plurality of lighting groups based on the comparison, and
storing the assignment, such that the first lighting group of the plurality of lighting groups can be regulated to a constant illuminance on the reference surface in a control loop based on the measurement values continuously detected by the at least one assigned light sensor.

2. The method as claimed in claim 1, wherein
the assigning of the at least one light sensor of the plurality of light sensors to the first lighting group occurs when the difference value is the highest among the difference values determined.

3. The method as claimed in claim 2, further comprising assigning at least one second light sensor of the plurality of light sensors to the first lighting group of the plurality of lighting groups when the difference value determined lies within a predetermined interval distance from the highest difference value.

4. The method as claimed in claim 2, further comprising assigning at least one second light sensor to the first lighting group of the plurality of lighting groups when a size of the first lighting group of the plurality of lighting groups exceeds a predetermined third number of luminaires.

5. The method as claimed in claim 1, wherein
the luminous flux of the remaining lighting groups other than the first lighting group of the plurality of lighting groups is switched off or remains switched off, or is reduced or remains reduced to a low dimming value during the switching the lighting of the lighting system into the first switching state.

6. The method as claimed in claim 5, wherein
the luminous flux of the remaining the lighting groups of the plurality of lighting groups is switched off or remains switched off, or is reduced or remains reduced to a low dimming value, during the switching the lighting of the lighting system into the second switching state.

7. The method as claimed in claim 1, wherein
the switching of the first lighting group into both of the first switching state and into the second switching state occurs by dimming or turning off the light sources of the first lighting group of the plurality of lighting groups.

8. The method as claimed in claim 1, wherein at least two light sensors of the plurality of light sensors are assigned to the first lighting group of the plurality of lighting groups; and
further comprising setting weighting factors for the regulation of the first lighting group of the plurality of lighting groups based on the measurement values continuously detected during operation by the at least two light sensors of the plurality of light sensors and further based on the comparison of the difference values of the at least two assigned light sensors of the plurality of light sensors to the first lighting group of the plurality of lighting groups.

9. The method as claimed in claim 8, wherein
the weighting factors comprise a higher weighting factor for a comparatively higher difference value and a lower weighting factor for a comparatively lower difference value.

10. The method as claimed in claim 1, wherein
the method occurs successively for the remaining lighting groups of the plurality of lighting groups other than the first lighting group.

11. The method as claimed in claim 10,
further comprising deactivating any light sensor not assigned to a lighting group of the plurality of lighting groups.

12. The method as claimed in claim 1,
further comprising initiating the method during operation of the lighting system by an event.

13. The method as claimed in claim 12, wherein
the event is the setting and storage of a regulation setpoint value in the control device.

14. The method as claimed in claim 12, wherein
the event occurs by way of a pushbutton, a motion detector, a time switch, or combinations thereof.

15. The method as claimed in claim 13, further comprising:
assigning at least one light sensor of the plurality of lighting sensors to a new lighting group of the plurality of lighting groups based on the comparison of the difference values determined, and
storing the new assignment in the control device only if a change in the difference values in the comparison exceeds a predetermined threshold value.

16. The method as claimed in claim 1, wherein
the method occurs by the control device.

17. The method as claimed in claim 1, wherein
the luminaires and the plurality of light sensors of the lighting system are connected to the control device in an individually addressable manner via a common data bus, and wherein each lighting group and its corresponding luminaires grouped therein and/or the assignment of each light sensor to a respective lighting group of the plurality of lighting groups are/is stored in a cache memory of the control device or of the plurality of light sensors.

18. A control device for assigning a plurality of light sensors for regulating the lighting in a lighting system in a space to be illuminated, said lighting system comprising:
a plurality of lighting groups, where each lighting group of the plurality of lighting groups comprises one or more luminaires,
a control device configured to regulate a luminous flux of each lighting group of the plurality of lighting groups, and
a plurality of light sensors where each light sensor of the plurality of light sensors is assigned to each lighting group of the plurality of lighting groups, the luminous flux of each lighting group being regulated by a corresponding light sensor of the plurality of light sensors,
wherein the control device is configured to carry out a method; wherein the method comprises:
switching the lighting of the lighting system into a first switching state such that a first lighting group of the plurality of lighting groups emits light with a predetermined luminous flux;
switching the lighting of the lighting system into a second switching state such that the first lighting group of the plurality of lighting groups emits light with a reduced luminous flux by comparison with the predetermined luminous flux or emits no light;
measuring a luminance of the light reflected by a reference surface by all of the light sensors of the plurality of light sensors assigned to the respective surface in the space to determine a first measurement value in the first switching state and a second measurement value in the second switching state for all of the light sensors of the plurality of light sensors;
determining a difference value from the first and second measurement values for each light sensor of the plurality of light sensors;
comparing all of the difference values determined for each light sensor of the plurality of light sensors to each other,
assigning at least one light sensor of the plurality of light sensors to the first lighting group of the plurality of lighting groups based on the comparison, and
storing the assignment, such that the first lighting group of the plurality of lighting groups can be regulated to a constant illuminance on the reference surface in a control loop based on the measurement values continuously detected by the at least one assigned light sensor.

* * * * *